US009559915B2

(12) United States Patent
Girmonsky

(10) Patent No.: US 9,559,915 B2
(45) Date of Patent: Jan. 31, 2017

(54) SYSTEM AND METHOD FOR DYNAMICALLY TESTING NETWORKED TARGET SYSTEMS

(71) Applicant: Blazemeter Ltd., Tel Aviv (IL)

(72) Inventor: Alon Girmonsky, Tel Aviv (IL)

(73) Assignee: Blazemeter Ltd., Tel Aviv (IL)

( * ) Notice: Subject to any disclaimer, the term of this patent is extended or adjusted under 35 U.S.C. 154(b) by 248 days.

(21) Appl. No.: 14/445,922

(22) Filed: Jul. 29, 2014

(65) Prior Publication Data

US 2015/0095703 A1 Apr. 2, 2015

Related U.S. Application Data

(60) Provisional application No. 61/885,013, filed on Oct. 1, 2013.

(51) Int. Cl.
*G06F 11/00* (2006.01)
*H04L 12/24* (2006.01)
*H04L 12/26* (2006.01)

(52) U.S. Cl.
CPC .......... *H04L 41/5009* (2013.01); *H04L 43/08* (2013.01); *H04L 43/50* (2013.01); *H04L 41/5038* (2013.01); *H04L 43/062* (2013.01)

(58) Field of Classification Search
CPC .............. G06F 11/3664; G06F 11/3684; G06F 11/3688
See application file for complete search history.

(56) References Cited

U.S. PATENT DOCUMENTS

| 5,218,605 | A | 6/1993 | Low et al. | |
|---|---|---|---|---|
| 6,502,102 | B1 * | 12/2002 | Haswell | G06F 11/3664 |
| 6,546,513 | B1 | 4/2003 | Wilcox et al. | |
| 7,028,223 | B1 * | 4/2006 | Kolawa | G06F 11/3688 |
| | | | | 714/37 |
| 7,209,851 | B2 * | 4/2007 | Singh | G01R 31/3183 |
| | | | | 702/108 |
| 7,840,851 | B2 | 11/2010 | Hayutin | |
| 7,844,036 | B2 | 11/2010 | Gardner et al. | |
| 8,060,791 | B2 | 11/2011 | Hayutin | |
| 8,239,831 | B2 | 8/2012 | Brennan et al. | |
| 8,276,123 | B1 * | 9/2012 | Deng | G06F 11/368 |
| | | | | 714/37 |
| 8,306,195 | B2 | 11/2012 | Gardner et al. | |
| 8,341,462 | B2 | 12/2012 | Broda et al. | |
| 8,510,600 | B2 | 8/2013 | Broda et al. | |

(Continued)

*Primary Examiner* — Bryce Bonzo
*Assistant Examiner* — Jeison C Arcos
(74) *Attorney, Agent, or Firm* — M&B IP Analysts, LLC

(57) ABSTRACT

A method and system for dynamically conducting performance testing of a networked target system (NTS) are provided. The method comprises receiving at least one test specification including a plurality of actions to be performed respective of the NTS; initializing an initial number of action repeater devices (ARDs) based on the at least one test specification, wherein the ARDs are communicatively connected to the NTS; setting each of the initial number of ARDs with at least one instruction and at least one parameter based on the plurality of actions; receiving, from the initial number of ARDs, information respective of performance of the NTS; and generating a performance testing report respective of the received information.

17 Claims, 4 Drawing Sheets

(56) References Cited

U.S. PATENT DOCUMENTS

| | | | |
|---|---|---|---|
| 2002/0133575 A1* | 9/2002 | Cidon | H04L 12/2602 709/220 |
| 2003/0110421 A1* | 6/2003 | Kurinami | G06F 11/3428 714/47.1 |
| 2004/0215673 A1* | 10/2004 | Furukawa | G06Q 20/3674 |
| 2004/0260516 A1* | 12/2004 | Czerwonka | G06F 11/3684 702/186 |
| 2006/0015294 A1* | 1/2006 | Yetter | G05B 23/0254 702/183 |
| 2006/0291398 A1* | 12/2006 | Potter | G06F 11/3688 370/241 |
| 2008/0066009 A1 | 3/2008 | Gardner et al. | |
| 2011/0066892 A1 | 3/2011 | Gardner et al. | |
| 2012/0017165 A1 | 1/2012 | Gardner et al. | |
| 2012/0246310 A1 | 9/2012 | Broda et al. | |
| 2013/0097307 A1 | 4/2013 | Vazac et al. | |
| 2013/0111257 A1 | 5/2013 | Broda et al. | |

\* cited by examiner

SYSTEM AND METHOD FOR DYNAMICALLY TESTING NETWORKED TARGET SYSTEMS

CROSS-REFERENCE TO RELATED APPLICATIONS

This application claims the benefit of U.S. Provisional Application No. 61/885,013 filed on Oct. 1, 2013, the contents of which are hereby incorporated by reference.

TECHNICAL FIELD

The present invention relates generally to systems for testing the performance of computer software applications and, more particularly, to systems and methods for testing the functionality of networked devices in real-time.

BACKGROUND

The worldwide web offers real-time access to large amount of data, enabling enterprises to provide information via widely accessible electronic communications networks in the form of a variety of computer programs. Such enterprises commonly spend a great deal of time and money testing the computer programs they develop in order to ascertain such programs' levels of functionality and performance. In order to test the operation of such computer programs, performance tests are performed to determine a program's behavior under both normal and anticipated peak load conditions, to troubleshoot performance problems, and to provide unit tests on a daily basis to developed modules.

Existing testing methods enable users to prepare testing scripts which include test parameters such as: the amount of networked devices to be used in the test, the actions to be taken by the networked devices through the test, and so on. Then, the test is executed respective of the script and a user device is used to monitor the performance of the system through the actions taken during the test. Upon identification of an event which requires additional testing parameters or tuning of the existing testing parameters, the test is terminated and a new test that includes the new and/or tuned testing parameters is executed. Such prior art solutions are static, as the additional required parameters can only be added upon termination of the originally executed test.

Existing methods for cloud load testing typically involve utilizing a cloud testing service provided by a cloud service vendor to generate web traffic originating from various locations around the world. Such testing often simulates many users in order to test services operating during peak anticipated loads. Some existing cloud load testing solutions are self-service (i.e., a user may implement the test without external services) but lack the ability to provide scalability for larger loads. Other existing solutions can scale for larger loads, but often require the involvement of professional services to run tests and, consequently, such tests may not be easily modified during testing. Such solutions are not as easily customizable to suit a given user's particular needs, especially if the user desires to change parameters during testing.

It would therefore be advantageous to provide a solution that would overcome the deficiencies of the prior art by enabling dynamic and real-time performance testing of networked systems.

SUMMARY

Certain disclosed embodiments include a method for dynamically testing networked target systems (NTSs). The method comprises: receiving at least one test specification including a plurality of actions to be performed respective of the NTS; initializing an initial number of action repeater devices (ARDs) based on the at least one test specification, wherein the ARDs are communicatively connected to the NTS; setting each of the initial number of ARDs with at least one instruction and at least one parameter based on the plurality of actions; receiving, from the initial number of ARDs, information respective of performance of the NTS; and generating a performance testing report respective of the received information.

Certain disclosed embodiments also include a method for dynamically testing networked target systems (NTSs). The method comprises: receiving at least one instruction and at least one parameter generated respective of a plurality of actions provided in a received test specification; testing the performance of the NTS using the at least one instruction and the at least one parameter; and gathering information respective of the performance testing of the NTS.

Certain disclosed embodiments also include a system for dynamically testing networked target systems (NTSs). The system comprises: a processor; and a memory, the memory containing instructions that, when executed by the processor, configure the system to: receive at least one test specification comprising a plurality of actions to be performed respective of the NTS; initialize an initial number of action repeater devices (ARDs) based on the at least one test specification, wherein the ARDs are communicatively connected to the NTS; set each of the initial number of ARDs with at least one instruction and at least one parameter based on the plurality of actions; received, from the initial number of ARDs, information respective of performance of the NTS; and generate a performance testing report respective of the gathered information.

Certain disclosed embodiments also include a system for dynamically testing networked target systems (NTSs). The system comprises: a processor; and a memory, the memory containing instructions that, when executed by the processor, configure the system to: received, by an action repeater device, at least one instruction and at least one parameter generated respective of a plurality of actions provided in a received test specification; test the performance of the NTS using the at least one instruction and the at least one parameter; and gather information respective of the performance testing of the NTS.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
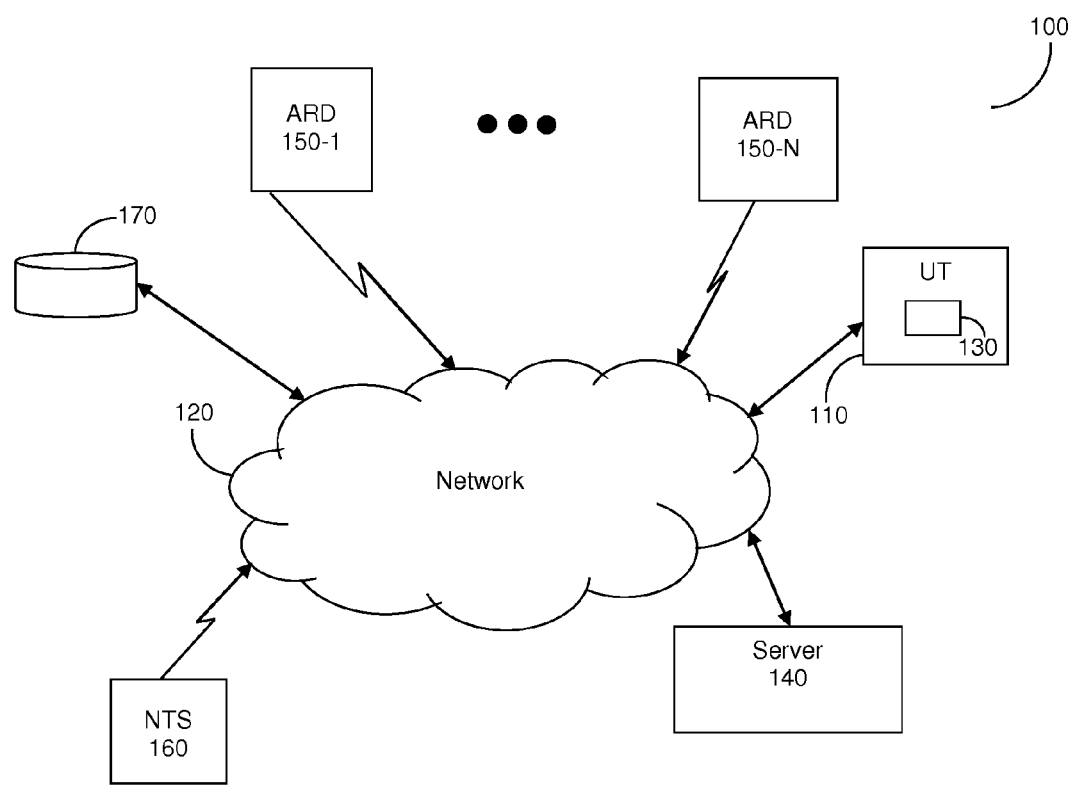
FIG. 1 is a schematic block diagram illustrating the various embodiments for dynamically testing networked target systems.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for dynamically testing networked systems. In various embodiments, a server is configured to receive a request from a user terminal to perform traffic simulation on a networked target system (NTS) as part of a performance testing procedure. Such a request often includes a command and a request to measure with respect of the NTS its response time, its availability under a particular workload, etc.

The server then, in a synchronous manner with the request, is configured to initialize a plurality of action repeater devices which are further configured to perform each action of the test procedure provided by the user terminal with respect of the networked target system respective of the request. Once operation begins, the server is configured to capture each action of the test procedure provided by the user terminal with respect to the networked target system. The server is further configured to provide the captured actions to the action repeater devices (ARDs). Then, the server is configured to gather information respective of the performance of the networked target system and a performance testing report is generated respective thereto.

FIG. 1 shows an exemplary and non-limiting block diagram of a system 100 for dynamically testing networked target systems according to an embodiment. A user terminal 110 is communicatively connected to a network 120. The network 120 may be a wireless, cellular, or wired network, a local area network (LAN), a wide area network (WAN), a metro area network (MAN), the Internet, the worldwide web (WWW), a combination thereof, and so on. The user terminal 110 may be, but is not limited to, a personal computer (PC), a smart phone, a tablet computer, a multi-user computer terminal, and so on. In one embodiment, an agent 130 installed on the user terminal 110 is utilized to initiate the testing actions. In a non-limiting embodiment, the agent 130 sends test requests and/or information to and receives testing data from the server 140. The agent 130 is typically a software code that is installed in a memory of the user terminal 110 and executed by a processing element of such user terminal 110.

The user terminal 110 is further communicatively connected to a server 140 over the network 120. A plurality of action repeater devices (ARDs) 150-1 through 150-N (hereinafter referred to individually as an ARD 150 or collectively as ARDs 150) are also communicatively connected to the network 120. The ARDs 150 are configured by the server 140 to simulate the operation of a plurality of user terminals (e.g., user terminal 110) according to testing information.

In various embodiments, the testing information may be provided by a user, either directly through the user terminal 110 or via the agent 130 installed on user terminal 110. Testing information may include one or more test specifications such as, but not limited to, the number of initial ARDs 150 to be used, the respective geographic locations of such ARDs, the type(s) of ARDs to be used, and so on. The ARDs 150 in one embodiment are implemented in a cloud-computing platform or executed by servers installed in a cloud-computing platform. The cloud-computing platform may be, for example, a private cloud system, a public cloud system, or a hybrid cloud system. The ARDs 150 may be dynamically allocated to de-allocated from performing a specific test. The changes to the number of ARDs 150 may be made during any time during the test being performed.

In an embodiment, testing information may be, but is not limited to, a file containing one or more test specifications. In such embodiments, the user may be able to select a predetermined test specification rather than programming the test specification. The server 140 is configured to use the ARDs 150 in order to test the performance of a networked target system 160 (NTS) which is also communicatively connected to the network 120.

The NTS 160 is accessible to and monitored by the server 140 over the network 120. The NTS 160 may be a web resource, such as a web service, a web application, a web site, a function within a web site, and the like. The NTS 160 may be part of the cloud-computing platform, such as a private cloud system, a public cloud system, or a hybrid cloud system. Actions taken by the ARDs 150 simulate particular loading conditions that may impact performance of the NTS 160. Information related to the performance of the NTS 160 during simulation may then be collected. A NTS may be, but is not limited to, a website, such as the Amazon® website, the Google® website, the Ticketmaster® website, and the like. That is, that testing can be performed for e-commerce websites, search engines, online ordering systems and the like. The function to perform within the website can be configured as part of the test specification. In addition, the specification can be configured on which terminal the NTS should be tested. For example, the load performance for accessing a website from smartphones versus desktops can be tested as well.

As a non-limiting example, an owner of a shopping website may wish to test network performance during peak shopping seasons. To this end, based on the anticipated load (i.e., number of visitors to the website) during such seasons, ARDs may be initialized to simulate heavy traffic on the website. Based on the simulation, information related to the website's performance during heavy traffic may be gathered and assembled in a testing report. The ARDs 150 can be configured to test load from different various direction and during different time of the week day. Thus, during the test ARDs 150 may be added or removed from the test according to the test specification.

A database 170, which may be used to store information respective of the performance of the NTS 160, is further connected to the network 120. It should be apparent to one of ordinary skill in the art that the server 140 may be further configured to test the performance of a plurality of NTSs.

According to the disclosed embodiments, the server 140 is configured to receive a request to test the operation of at least one NTS (e.g., NTS 160) and respective testing information. As noted above, testing information may include one or more test specifications. A test specification may include, but is not limited to, the amount of initial ARDs 150 to be used, respective geographical locations of such ARDs 150, the type(s) of the ARDs 150, the type of test, type of terminal devices accessing the NTS, and so on.

Respective of the testing information, the server 140 is configured to set a plurality of ARDs 150 to perform actions for testing the NTS 160. Actions may be provided by the user terminal by, e.g., being included in the testing information, being performed by the user terminal, being performed by an agent installed on the user terminal, and so on. The server 140 is configured to capture, in real-time, the actions provided by the user terminal 110 with respect to the NTS 160 and set ARDs 150 based on each of the captured actions. The server 140 is further configured to allocate ARDs 150 for the test, set each allocated ARD with a set of instructions and parameters for the action to be performed by the ARD. The parameters may be, for example, network parameters of the NTS 160, such IP addresses, URLs, port IDs, protocol types, and so on. Each ARD 150 may be reconfigured with a different set of instructions and parameters during the test. In additional, ARDs 150 can be allocated to increase the test capacity or to remove ARDs 150 from test to reduce capacity of test. Therefore, the server 140 by configuring the ARDs 150 provides dynamic testing solution for the NTS. The server 140 is further configured to gather information respective of the performance of the NTS 160 and to generate a performance testing report based on the information.

Figure 2:
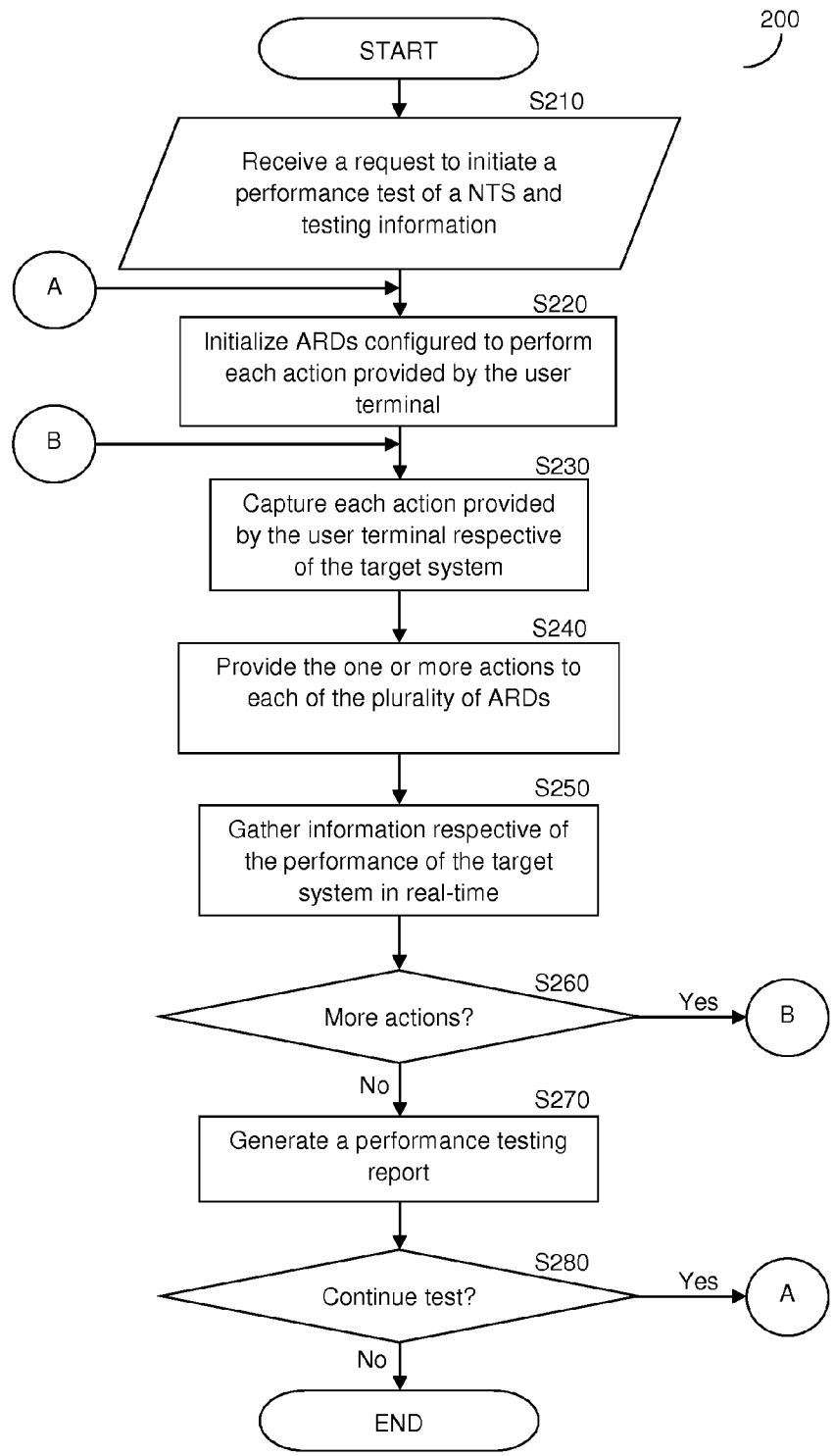
FIG. 2 is a flowchart illustrating a method for dynamically testing a networked target system in accordance with an embodiment.

FIG. 2 depicts an exemplary and non-limiting flowchart 200 describing a method for performance testing of a NTS in accordance with an embodiment. In S210, a request to initiate a performance test of at least one NTS (e.g., the NTS 160) and respective testing information is received from a user terminal (e.g., user terminal 110). The testing information includes at least one test specification discussed in detail above.

In S220, respective of the received testing information, each ARD of a plurality of ARDs (e.g., ARDs 150) is initialized. Each ARD is adjusted to perform each of the actions provided by the user terminal 110 respective of an NTS (e.g., the NTS 160). Operation of ARDs such as ARDs 150 is discussed further herein below with respect to FIG. 4. In S230, each action specified in the test specification respective of the testing of NTS is captured. In an embodiment, this capture is performed by a server (e.g., server 140).

In S240, an initial set of ARDs are initialized, allocated or otherwise instantiated based on the test specification. In S245, each of the initial ARDs are set with instructions and parameters according to the captured actions. In S250, information respective of the performance of the NTS is gathered. In S260, it is checked whether setting of the ARDs should be updated based on the initial test specification or modified test specification later provided through the user terminal. The setting of ARDs may include changing the number of ARDs currently set for the test and/or changing the configuration of one or more ARDs based on the provided additional actions. If S260 results in a yes answer, execution continues with S230; otherwise, execution continues with S270.

In S270, a performance testing report is generated respective of the gathered information. The performance testing report may include, but is not limited to, estimated maximum capacity, errors received during testing, throughput of the NTS, response time, and so on. In S280, it is checked whether testing will continue and, if so, execution continues with S220; otherwise, execution terminates.

As a non-limiting example, a request to initiate a performance test of a NTS and testing information is received. In this example, the NTS being tested is a website which allows users to order food from restaurants online. The testing information indicates that 10,000 ARDs from the same geographic location will be utilized for the test. A user terminal performs several actions, including logging in to the site and ordering a few food items. These actions are captured and provided to the ARDs. Each ARD repeats the actions provided to it, thereby simulating 10,000 more users of the website performing the actions. Information related to the simulation is gathered and assembled to generate a performance testing report.

As another non-limiting example, a request to initiate a performance test of a NTS and testing information is received. In this example, the NTS being tested is a shopping website. The testing information indicates that 100,000 ARDs from 5 different geographic locations will be utilized for the test. Additionally, the testing information includes at least one test specification providing actions to be taken by each ARD. In this example, all ARDs will log in to the website, but some ARDs will make purchases, while others will return purchased items. These actions are captured and provided to the ARDs. Each ARD repeats the actions provided to it, thereby simulating 100,000 more users of the website performing such actions. Information related to the simulation is gathered and assembled to generate a performance testing report.

Figure 3:
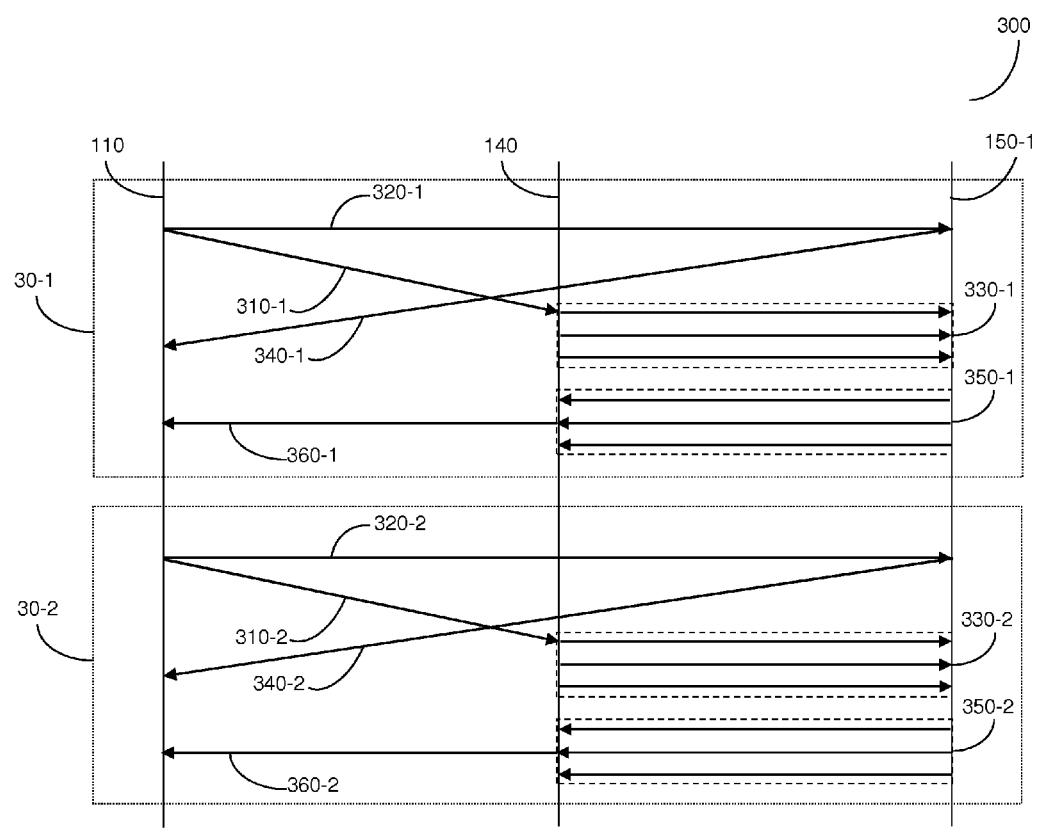
FIG. 3 is a schematic communication diagram illustrating interactions between ARDs while performing a method for dynamically testing a networked target system in accordance with an embodiment.

FIG. 3 depicts an exemplary and non-limiting schematic communication diagram 300 illustrating a method for dynamically testing a networked target system (NTS) in accordance with the embodiment described in FIGS. 1 and 2. The schematic communication diagram 300 demonstrates two cycles of captures of actions provided by the user terminal 110 and performance of the captured actions by the plurality of ARDs 150. In the first cycle 30-1, the method starts when a request 310-1 to initiate a performance testing is sent from the user terminal 110 over the network 120 and received by the server 140. An action 320-1 is provided by the user terminal 110 with respect to the NTS 160 (NTS 160 not shown in FIG. 3). In an embodiment, action 320-1 may be a set of more than one action.

Respective of the action 320-1 and the request 310-1, each of the plurality of ARDs 150 is initialized to perform action(s) 330-1. Action(s) 330-1 are the same actions as the action(s) 320-1. Respective of the action(s) 320-1, a response 340-1 is sent by the NTS 160 to the user terminal 110 and a response(s) 350-1 is sent by the NTS 160 to the server 140. The server 140 is configured to gather information respective of the system based on the response(s) 350-1. Respective of the gathered information, in 360-1, the server 140 is configured to generate a performance testing report and sends the report to the user terminal 110.

The second cycle 30-2 shows the capture and performance of another action 320-2 with the plurality of ARDs according to an embodiment. The cycle starts when a request 310-2 to initiate a performance testing is sent from the user terminal 110 over the network 120 and received by the server 140. An action 320-2 is provided by the user terminal 110 with respect to the NTS 160 (NTS 160 not shown in FIG. 3). In a further embodiment, action 320-2 may be a set of actions.

Respective of the action 320-2 and the request 310-2, each of the plurality of ARDs 150 is initialized to perform action(s) 330-2. Action(s) 330-2 are the same actions as the action(s) 320-2. Respective of the action(s) 320-2, a response 340-2 is sent by the NTS 160 to the user terminal 110 and a response(s) 350-2 is sent by the NTS 160 to the server 140, wherein the server 140 is configured to gather information respective of the system based on the response(s) 350-2. Respective of the gathered information, in 360-2, the server 140 is configured to generate a performance testing report and to send the report to the user terminal 110.

Figure 4:
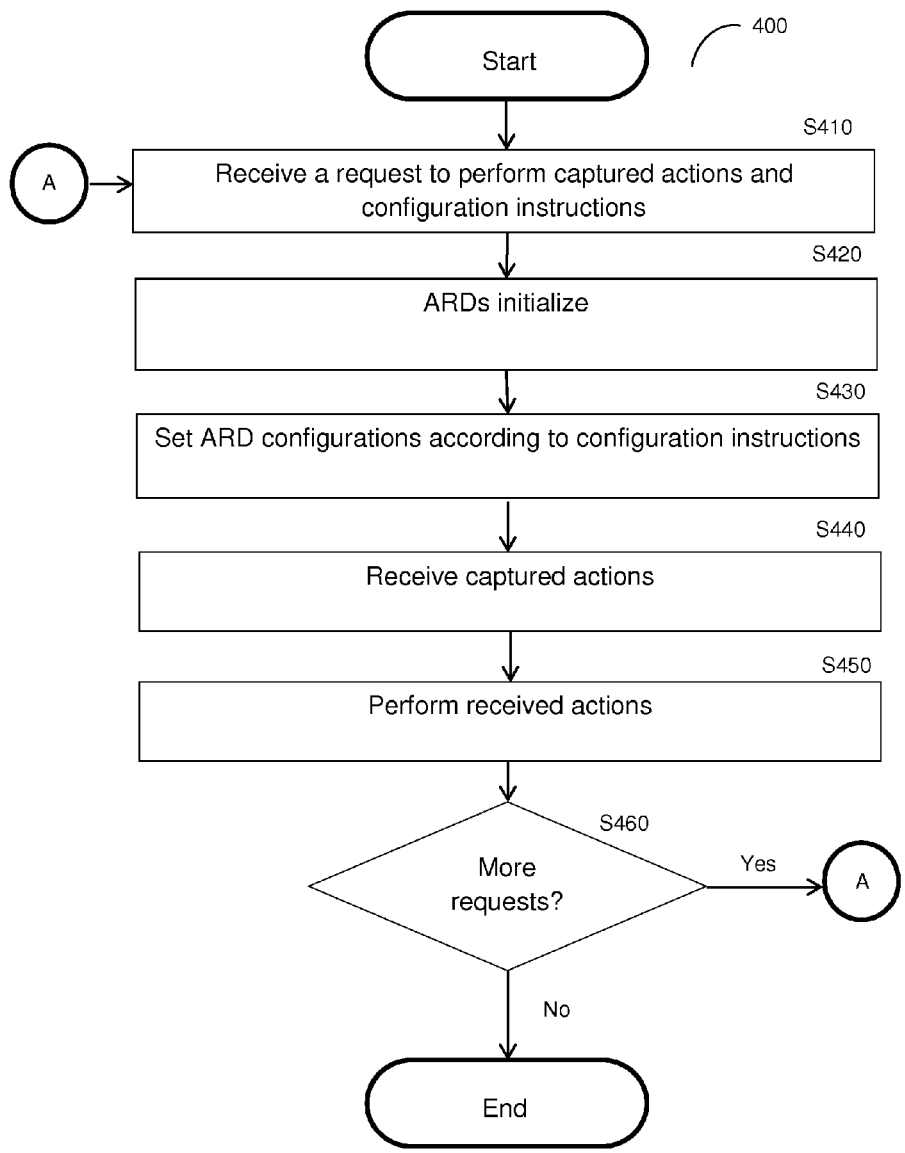
FIG. 4 is a flowchart illustrating operation of action repeater devices according to an embodiment.

FIG. 4 is an exemplary and non-limiting flowchart 400 illustrating operation of action repeater devices (ARDs, e.g., ARDs 150) according to an embodiment. In S410, a request to perform captured performance testing actions, configuration instructions and parameters are received. In an embodiment, such request and instructions may be received from a server (e.g., server 140). In another embodiment, configuration instructions may be retrieved from, e.g., a storage device. Captured performance testing actions include all actions provided by, e.g., a user terminal (e.g., user terminal 110) such that, when performed by the ARDs, all actions originally provided by the user terminal are repeated by ARDs. Configuration instructions are typically determined based on testing information provided respective of the testing to be performed, and may include, but are not limited to, which ARDs to initialize, which actions to be repeated by each ARD, and so on.

Responsive to the request, in S420, the ARDs initialize. In S430, each ARD sets its respective configuration according to the received configuration instructions and parameters. In an embodiment, each ARD may receive different configuration instructions and parameters. In order to test a response time of a website when accessed, a configuration instruction may be sending hypertext transfer protocol (HTTP) request the configuration parameter may be a URL of the website. The ARD will measure that the time elapsed until an HTTP response has been received from the website. The measured time is reported to the server 140. The ARD can repeat that action predefined every time interval.

In S440, the captured performance testing actions are received. Such captured actions may be received from, e.g., a server, a user device, a storage device, and so on. In S450, the received performance testing actions are performed. In S460, it is checked whether additional requests to perform captured actions have been received and, if so, execution continues with S410; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A computerized method for dynamically conducting performance testing of a networked target system (NTS), comprising:
   receiving at least one test specification including a plurality of actions to be performed respective of the NTS;
   initializing an initial number of action repeater devices (ARDs) based on the at least one test specification, wherein the initial number of ARDs are communicatively connected to the NTS;
   setting each of the initial number of ARDs with at least one instruction and at least one parameter based on the plurality of actions;
   receiving, from the initial number of ARDs, information respective of performance of the NTS; and
   generating a performance testing report respective of the received information.

2. The computerized method of claim 1, wherein the at least one test specification further comprises at least one of: a number of ARDs to be used, at least one geographic location of ARDs to be used, at least one type of ARDs to be used, and at least one actions to be repeated by the ARDs.

3. The computerized method of claim 2, further comprising:
   dynamically changing the initial number of ARDs based on the received test specification or a modified test specification.

4. The computerized method of claim 3, further comprising:
   dynamically changing the at least one instruction and the at least one parameter based on the received test specification or a modified test specification.

5. The computerized method of claim 1, wherein the NTS is a web resource.

6. The computerized method of claim 1, wherein the NTS is partially or completely in a cloud-computing platform, wherein the cloud-computing platform is at least one of: a public cloud system, a private cloud system, and a hybrid cloud system.

7. The computerized method of claim 1, wherein the initial number of ARDs are deployed in a cloud-computing platform, wherein the cloud-computing platform is at least one of: a public cloud system, a private cloud system, and a hybrid cloud system.

8. The computerized method of claim 1, wherein the performance testing report comprises: an estimated maximum capacity; if at least one error was received during testing, the at least one error received during testing; throughput of the NTS; and a response time of the NTS.

9. A non-transitory computer readable medium having stored thereon instructions for causing one or more processing units to execute the computerized method according to claim 1.

10. A system for dynamically conducting performance testing of a networked target system (NTS), comprising:
    a processor; and
    a memory, the memory containing instructions that, when executed by the processor, configure the system to:
       receive at least one test specification comprising a plurality of actions to be performed respective of the NTS;

initialize an initial number of action repeater devices (ARDs) based on the at least one test specification, wherein the initial number ARDs are communicatively connected to the NTS;

set each of the initial number of ARDs with at least one instruction and at least one parameter based on the plurality of actions;

receive, from the initial number of ARDs, information respective of performance of the NTS; and generate a performance testing report respective of the received information.

11. The system of claim 10, wherein the at least one test specification comprises at least one of: a number of ARDs to be used, at least one geographic location of ARDs to be used, at least one type of ARDs to be used, and at least one action to be repeated by the ARDs.

12. The system of claim 11, wherein the system further configured to:

dynamically change the initial number of ARDs based on the received test specification or a modified test specification.

13. The system of claim 12, wherein the system further configured to:

dynamically change the at least one instruction and the at least one parameter based on the received test specification or a modified test specification.

14. The system of claim 10, wherein the NTS is a web resource.

15. The system of claim 10, wherein the NTS is partially or completely in a cloud-computing platform, wherein the cloud-computing platform is at least one of: a public cloud system, a private cloud system, and a hybrid cloud system.

16. The system of claim 10, wherein the initial number ARDs are deployed in a cloud-computing platform, wherein the cloud-computing platform is at least one of: a public cloud system, a private cloud system, and a hybrid cloud system.

17. The system of claim 10, wherein the testing report performance comprises: an estimated maximum capacity; if at least one error was received during testing, the at least one errors received during testing; a throughput of the NTS; and a response time of the NTS.

* * * * *